United States Patent [19]

Jäger et al.

[11] Patent Number: 5,693,265
[45] Date of Patent: Dec. 2, 1997

[54] WATER AERATOR

[76] Inventors: Arnold Jäger, Gehrbergsweg 6, 31303 Burgdorf; Andreas Jäger, Muthesiusweg 45; Sebastian Jäger, Borchersstr. 2, both of 30559 Hannover, all of Germany

[21] Appl. No.: 642,450

[22] Filed: May 3, 1996

[30] Foreign Application Priority Data

May 4, 1995 [DE] Germany .................. 295 07 293.8

[51] Int. Cl.$^6$ .................................................. B01F 3/04
[52] U.S. Cl. ........................................ 261/122.2; 215/321
[58] Field of Search ................. 261/122.2; 215/321, 215/228

[56] References Cited

U.S. PATENT DOCUMENTS

| | | |
|---|---|---|
| 3,298,415 | 1/1967 | Klygis ............................ 215/321 |
| 3,460,701 | 8/1969 | Powalowski et al. ............ 215/321 |
| 3,997,634 | 12/1976 | Downs ........................... 261/122.2 |
| 4,103,798 | 8/1978 | Moeller .......................... 215/321 |
| 4,162,736 | 7/1979 | Faulstich ........................ 215/321 |
| 4,981,623 | 1/1991 | Ryan ............................. 261/122.2 |
| 5,314,084 | 5/1994 | Folta et al. ..................... 215/321 |
| 5,330,688 | 7/1994 | Downs ........................... 261/122.2 |

FOREIGN PATENT DOCUMENTS 2035651  1/1972  Germany ........................ 261/122.2

*Primary Examiner*—Tim R. Miles
*Attorney, Agent, or Firm*—Robert W. Becker & Associates

[57] ABSTRACT

A water aerator is provided that has a rigid support plate that in the operating position is disposed essentially horizontally. The support plate has a practically planar upper surface and at least one aperture for air. An elastic plate of elastomeric material is disposed on the upper surface of the support plate. The elastic plate is provided with a plurality of fine slits that can be widened by air that is introduced between the support plate and the elastic plate. The elastic plate has a rim that sealingly surrounds the downwardly directed rim of the support plate to be secured thereto in a hook-type manner.

20 Claims, 2 Drawing Sheets

WATER AERATOR

BACKGROUND OF THE INVENTION

The present invention relates to a water aerator having a rigid carrier or support plate that in the operating position is disposed essentially horizontally. The upper surface is planar and the aerator has at least one aperture. An elastic plate of rubber or the like is disposed on the support plate and its rims are sealingly secured to the downwardly angled-off rims of the support plate. The elastic plate has a plurality of fine slits, whereby air can be introduced between the support plate and the elastic plate and widens the slits.

With heretofore known water aerators of this general type, the rim of the elastic plate is disposed over the outside of the downwardly directed angled-off rim of the support plate. The rim of the elastic plate is then surrounded by a steel collar in order to secure the elastic plate.

It is therefore an object of the present invention to improve the securement of the elastic plate of water aerators of the aforementioned general type in such a way that with a special positive securement of the rim of the elastic plate, assembly and disassembly of the elastic plate can be facilitated.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Pursuant to the present invention, the rim of the elastic plate surrounds the downwardly directed and angled-off rim of the support plate. In this way, a positive connection is achieved in that the rim of the elastic plate embraces the downwardly directed angled-off rim of the support plate in a hook-type manner. In this connection, the rim of the elastic plate can be embodied in such a way that the downwardly directed and angled-off rim of the support plate is entirely surrounded by the rim of the elastic plate. For the realization of such a positive connection, the rim portion of the elastic plate can have a smaller diameter than does the support plate in order during assembly to impart to the elastic plate a slight prestress. This improves the holding forces even more and brings about an additional positive frictional connection.

The edge portions of the elastic plate are additionally advantageously embodied in such a way that they are thicker, and in particular preferably in such a way that this thickness is several times greater than that of the active part of the elastic plate that is provided with the slits. This provides a robust holding ring on the elastic plate.

Pursuant to a specific embodiment of the present invention, the upper side of the elastic plate is not planar; rather, the elastic plate is provided with a terminating bead that surrounds the planar surface of the elastic plate and that thus projects beyond the planar upper, active surface of the elastic plate. This results not only in a desirable reinforcement and a strip that can be gripped, but a favorable flow effect is also achieved. In particular, during operation of the aerator this circumferential bead prevents disadvantageous transverse flows (radial flows) from resulting that could lead to too great of a restriction of the rising air/water mixture. Thus, a wider air stream of fine bubbles is achieved. It should be noted that this type of rim configuration of the elastic plate can also be utilized for such water aerators that have a different securement of the rim of their elastic plate to the support plate.

Further specific features of the present invention will be described in detail subsequently.

DESCRIPTION OF PREFERRED EMBODIMENTS

Figure 1:
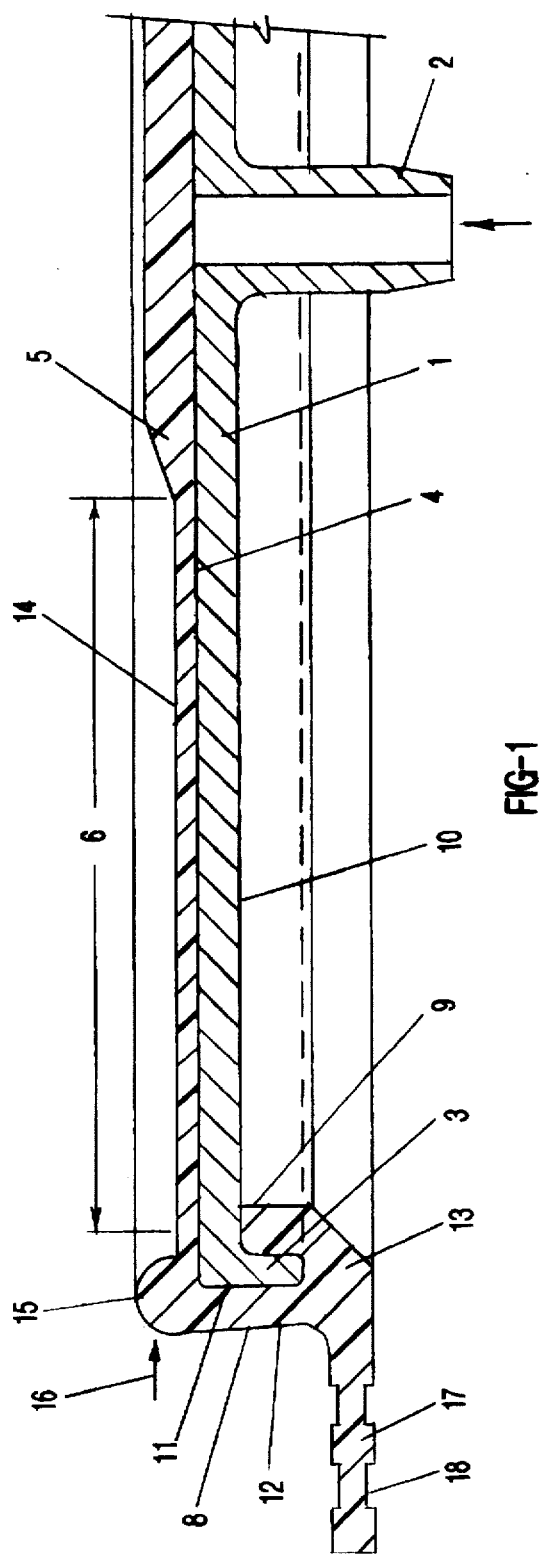
FIG. 1 is a vertical cross-sectional view through one exemplary embodiment of the inventive plate-type water aerator.
Figure 3:
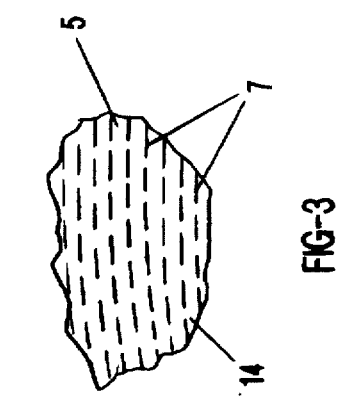
FIG. 3 is a partial plan view of that portion of the aerator of FIG. 1 that is provided with slits.
Figure 2:
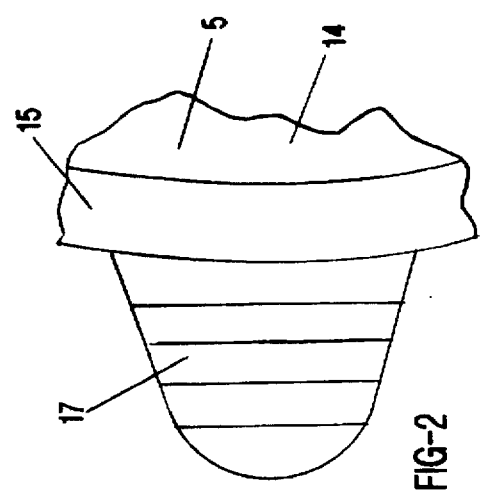
FIG. 2 is a partial plan view of the rim portion of the aerator of FIG. 1.

Referring now to the drawings in detail, the inventive aerator is disposed horizontally in the water, and is supplied from a common main to which the aerator is connected. The connection and the support are effected by means of a connector 2 that is centrally disposed on and extends perpendicular to the bottom of a rigid carrier or support plate 1; a hose, tube, or the like is connected to the connector 2. The support plate 1 is in the form of a molded plastic body or the like and has a circumferential rim 3 that is angled off and extends perpendicularly downwardly. Disposed on the practically planar upper surface 4 of the support plate 1 is an elastic plate 5 that is embodied as a molded rubber body and has a thicker portion above the connector 2. Over the greatest portion of its extension (the ring-shaped portion 6), the plate 5 is provided with fine slits 7. As can be seen from FIG. 1, the plate 5 is positively connected to the rim 3 of the support plate 1.

When compressed air is introduced into the connector 2, the air passes between the surface 4 and the elastic plate 5. The fine slits 7 open so that fine air bubbles pass into the water. When no air is being supplied to the aerator, the slits 7 close in a sealed manner.

A circumferential rim 8 of the elastic plate 5 surrounds the rim 3 of the plate 1, with the upwardly directed leg 9 of the rim 8 extending to the underside 10 of the plate 1. This results in a hook-type connection that although it can be released by elastically deforming the plate 5, is secure and airtight under the pressure of the compressed air. In order to achieve a mechanically secure coupling, the thicknesses of not only the leg 12 that rests upon the outer circumferential surface 11 of the rim 3, but also the leg 9 and the part 13 that connects the legs, are such that the thicknesses of these parts are approximately 2 to 3 times as great as the thickness of the plate 5 in the ring-shaped portion 6. In addition, the diameter of the plate 5, in the non-installed state, is slightly smaller, by approximately 1–4%, so that the rim 8 surrounds the support plate 1 with an elastic inherent stress. This produces positive and frictional connections between the support plate 1 and the plate 5.

The outer circumferential portion of the plate 5 does not merge levelly with the leg 12. Rather, the outer circumferential edge of the upper surface 14 is defined by a circumferential bead 15 that is rounded at the top and has a height that is a multiple of the thickness of the ring-shaped portion 6. This bead 15 reinforces not only the rim 8 and not only enables better handling, but it also forms a sort of obstacle for the transverse flow of water in the direction of the arrow 16. If the bead 15 were not provided, such a transverse flow of water could lead to a reduction or constriction of the discharging stream of bubbles. By providing the bead 15, the stream of bubbles is expanded and made more effective.

The rim 8 can also be provided with one or more projecting tabs 17. These tabs can be manually grasped and facilitate assembly and disassembly. The tab 17 are expediently disposed in the region of the leg-connecting part 13, and in particular project out radially. The tabs 17 have a ribbing 18 in order to enhance the ability to grasp the tabs.

Figure 4:
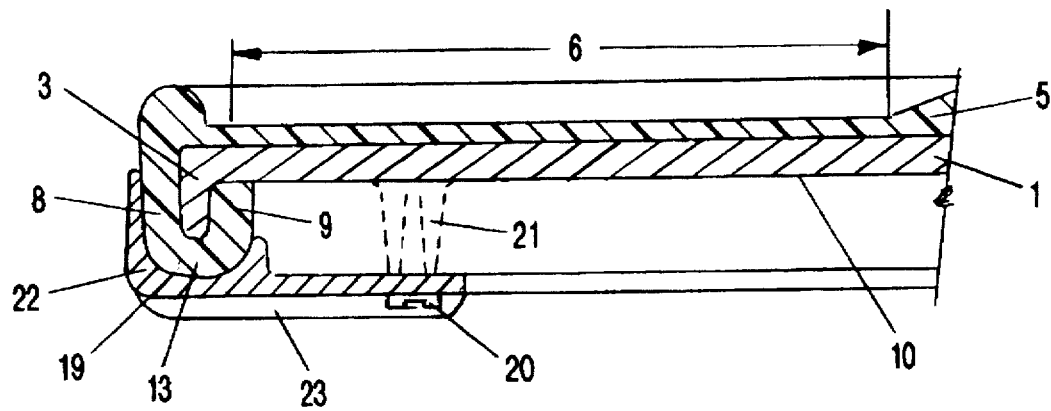
FIGS. 4–6 are vertical cross-sectional views through modified inventive plate-type water aerators.
Figure 5:
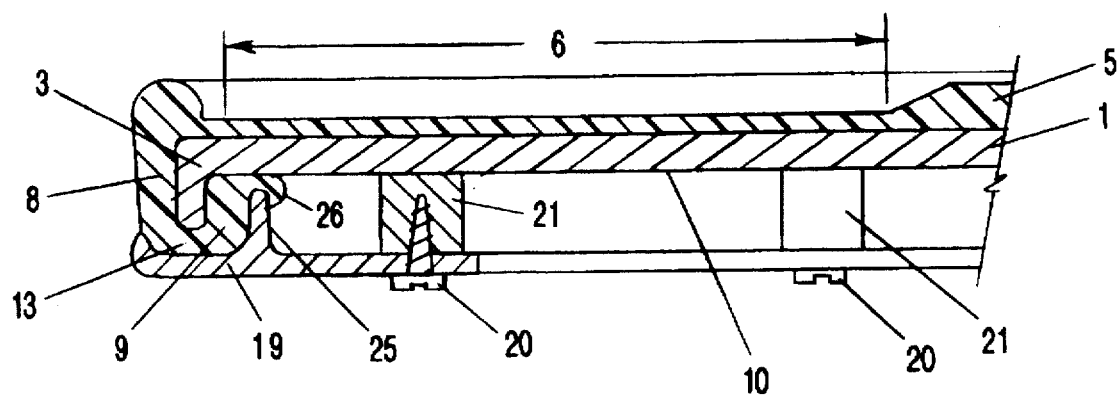
Figure 6:
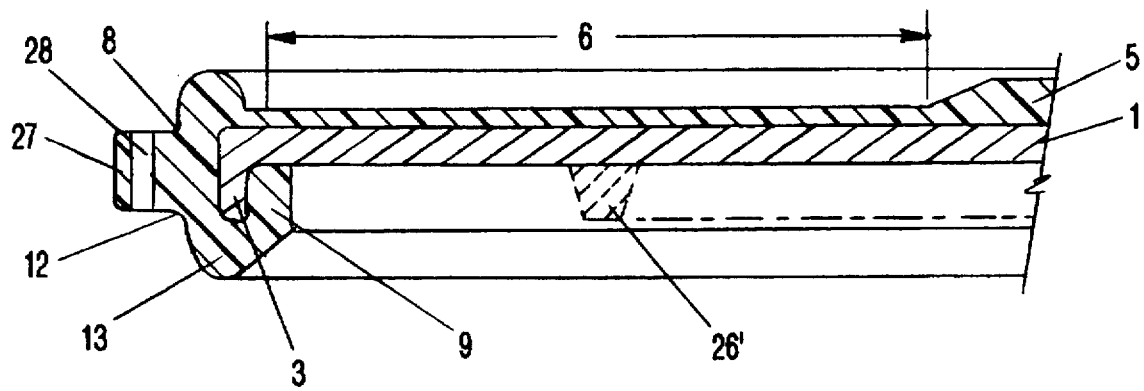

For particularly great stresses, the positive connection between the two rims 3 and 8 can be secured by additional measures. For this reason, pursuant to the embodiments illustrated in FIGS. 4 and 5, a rigid ring 19 is secured below the support plate 1, for example by screws 20 that are distributed about the periphery of the ring 19 and are screwed into projections 21 on the underside of the support plate 1. In the embodiment of FIG. 4, the outer periphery of the ring 19 is provided with a circumferential recess or hollow 22 for receiving the leg-connecting part 13. The ring 19 can also be provided with radial ribs 23 to provide a reinforcement on the underside. In the embodiment of FIG. 4, the ring 19 is configured and secured in such a way that in the mounted state the part 13 that connects the legs is clamped in between the ring 19 and the rim 3. Such a clamping effect is also produced with the ring 19 of the embodiment of FIG. 5, although in this embodiment the ring 19 has an additional rib 25 that is directed toward the support plate 1 and acts upon a radially inwardly directed rim 26 of the leg 9 to similarly clamp this rim in by pressing it against the support plate 1. In the embodiment illustrated in FIG. 6, the underside of the support plate 1 is provided with a concentrically arranged circumferential ring 26' that is illustrated by a dot-dash line and can similarly be used to receive the screws 20. In the embodiment of FIG. 6, there is no ring 19. The leg 12 either has a circumferential projection 27, or has several projections disposed over its periphery; the projection 27 is provided with a hole 28 that can serve for accommodating or having passed therethrough wires, threads, or similar filaments that can be interlaced or interconnected or can be connected to special anchoring means.

The present invention is, of course, in no way restricted to the specific disclosure of the specification and drawings, but also encompasses any modifications within the scope of the appended claims.

What we claim is:

1. A water aerator comprising:
   a rigid support plate that in an operating position is disposed essentially horizontally and has a practically planar upper surface, said support plate having at least one aperture for air and also having a downwardly directed and angled-off rim; and
   an elastic plate of elastomeric material that is disposed on said upper surface of said support plate and is provided with a plurality of fine slits that are adapted to be widened by air received by said support plate and introduced from said at least one aperture between said support plate and said elastic plate, said elastic plate having a rim means that sealingly surrounds said downwardly directed rim of said support plate to be secured thereto in a hook-type manner, wherein a rigid ring is secured to an underside of said support plate, said ring clamping at least portions of said hook-shaped rim means of said elastic plate between said ring and said support plate, and wherein said ring has an outer periphery that is provided with a hollow for receiving a lower, bent portion of said rim means of said elastic plate.

2. A water aerator according to claim 1, wherein said rim means of said elastic plate surrounds said downwardly directed rim of said support plate in a manner free from play.

3. A water aerator according to claim 1, wherein at least portions of the surrounding rim means have a thickness that is considerably greater than the thickness of a portion of said elastic plate that is provided with said slits.

4. A water aerator according to claim 1, wherein said rim means of said elastic plate is positively frictionally connected to said downwardly directed and angled-off rim of said support plate by means of elastic inherent stress of said elastic plate.

5. A water aerator according to claim 1, wherein said rim means of said elastic plate is provided with at least one projecting tab as a handgrip.

6. A water aerator according to claim 1, wherein said rim means of said elastic plate is either provided with a plurality of projections distributed over its periphery or with a circumferential projection, with said projection or projections being provided with a plurality of holes for receiving filamentary fastening means.

7. A water aerator according to claim 1, wherein said rim means of said elastic plate comprises a first leg that projects downwardly from said elastic plate, with said first leg being provided with a connecting part that is disposed remote from said elastic plate, and wherein a second leg extends upwardly from said connecting part toward said elastic plate, wherein said downwardly directed rim of said support plate is surrounded by said first and second legs and said connecting part of said rim means of said elastic plate.

8. A water aerator according to claim 1, wherein said elastic plate has an upper surface that is surrounded by a circumferential bead that is disposed in the vicinity of said rim means.

9. A water aerator according to claim 8, wherein said bead has a height that is considerably greater than the thickness of a portion of said elastic plate that is provided with said slits.

10. A water aerator according to claim 8, wherein said bead is part of said surrounding rim means.

11. A water aerator comprising:
    a rigid support plate that in an operating position is disposed essentially horizontally and has a practically planar upper surface, said support plate having at least one aperture for air and also having a downwardly directed and angled-off rim; and
    an elastic plate of elastomeric material that is disposed on said upper surface of said support plate and is provided with a plurality of fine slits that are adapted to be widened by air received by said support plate and introduced from said at least one aperture between said support plate and said elastic plate, said elastic plate having a rim means that sealingly surrounds said downwardly directed rim of said support plate to be secured thereto in a hook-type manner, wherein a rigid ring is secured to an underside of said support plate, said ring clamping at least portions of said hook-shaped rim means of said elastic plate between said ring and said support plate, and wherein said rim means of said elastic plate is provided with a radially inwardly projecting rim portion that is engaged by a rib of said ring.

12. A water aerator according to claim 11, wherein said rim means of said elastic plate surrounds said downwardly directed rim of said support plate in a manner free from play.

13. A water aerator according to claim 11, wherein at least portions of the surrounding rim means have a thickness that is considerably greater than the thickness of a portion of said elastic plate that is provided with said slits.

14. A water aerator according to claim 11, wherein said rim means of said elastic plate is positively frictionally connected to said downwardly directed and angled-off rim of said support plate by means of elastic inherent stress of said elastic plate.

15. A water aerator according to claim 11, wherein said rim means of said elastic plate is provided with at least one projecting tab as a hand grip.

16. A water aerator according to claim 11, wherein said rim means of said elastic plate is either provided with a plurality of projections distributed over its periphery or with a circumferential projection, with said projection or projections being provided with a plurality of holes for receiving filamentary fastening means.

17. A water aerator according to claim 11, wherein said rim means of said elastic plate comprises a first leg that projects downwardly from said elastic plate, with said first leg being provided with a connecting part that is disposed remote from said elastic plate, and wherein a second leg extends upwardly from said connecting part toward said elastic plate, wherein said downwardly directed rim of said support plate is surrounded by said first and second legs and said connecting parts of said rim means of said elastic plate.

18. A water aerator according to claim 11, wherein said elastic plate has an upper surface that is surrounded by a circumferential bead that is disposed in the vicinity of said rim means.

19. A water aerator according to claim 18, wherein said bead is a part of said surrounding rim means.

20. A water aerator according to claim 18, wherein said bead has a height that is considerably greater than the thickness of a portion of said elastic plate that is provided with said slits.

* * * * *